J. L. GREEN.
PROCESS FOR MANUFACTURING POTS FOR MELTING GLASS.
APPLICATION FILED MAY 29, 1911.
1,057,544.
Patented Apr. 1, 1913.
2 SHEETS—SHEET 1.
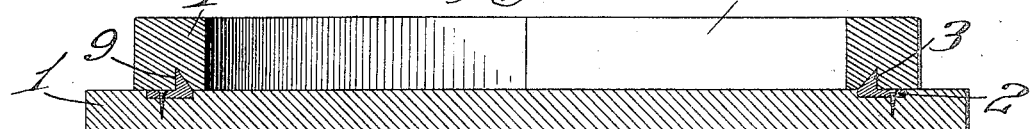
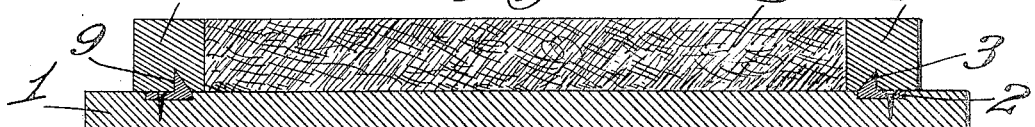
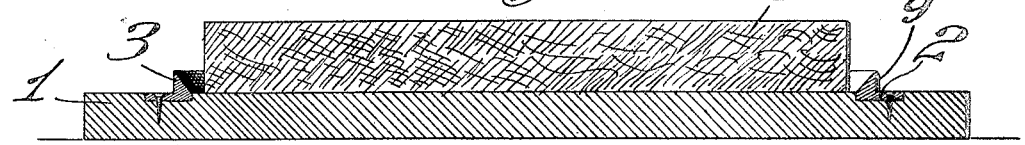
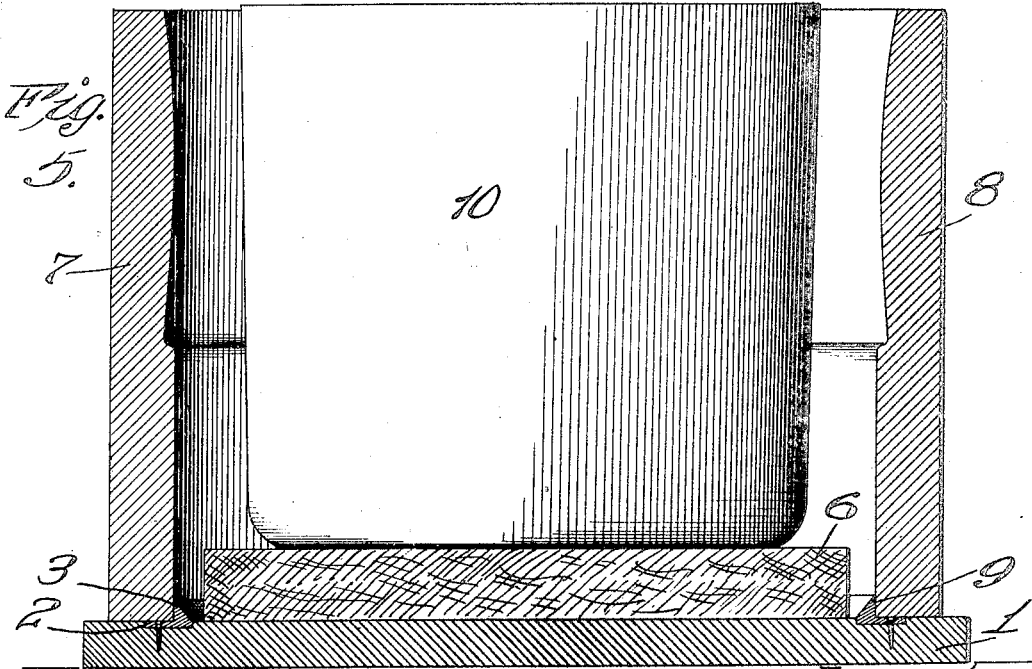

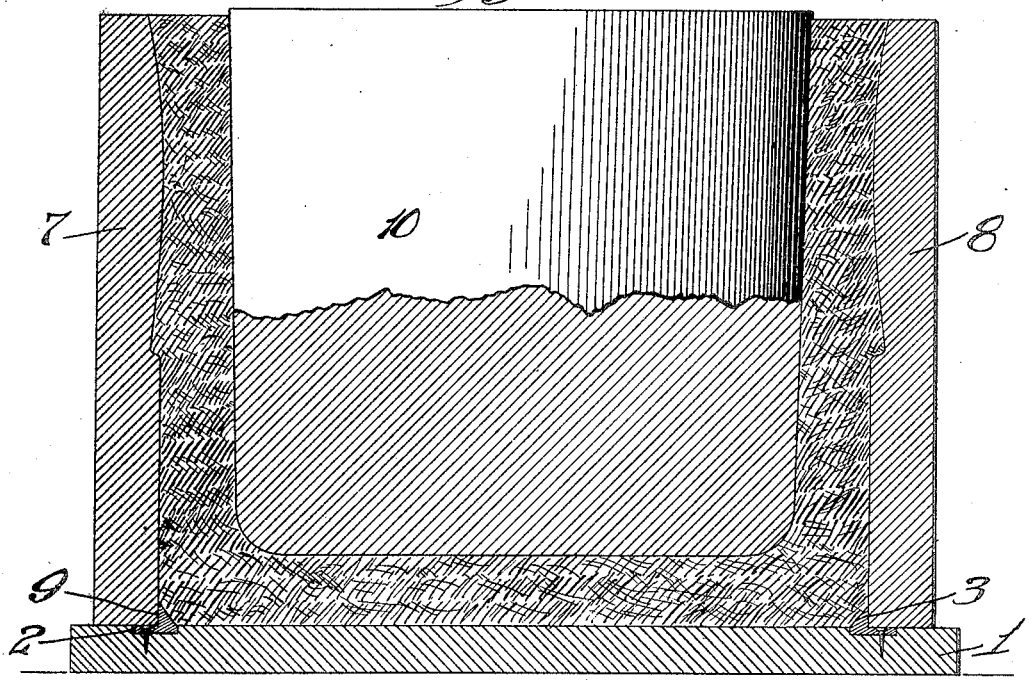
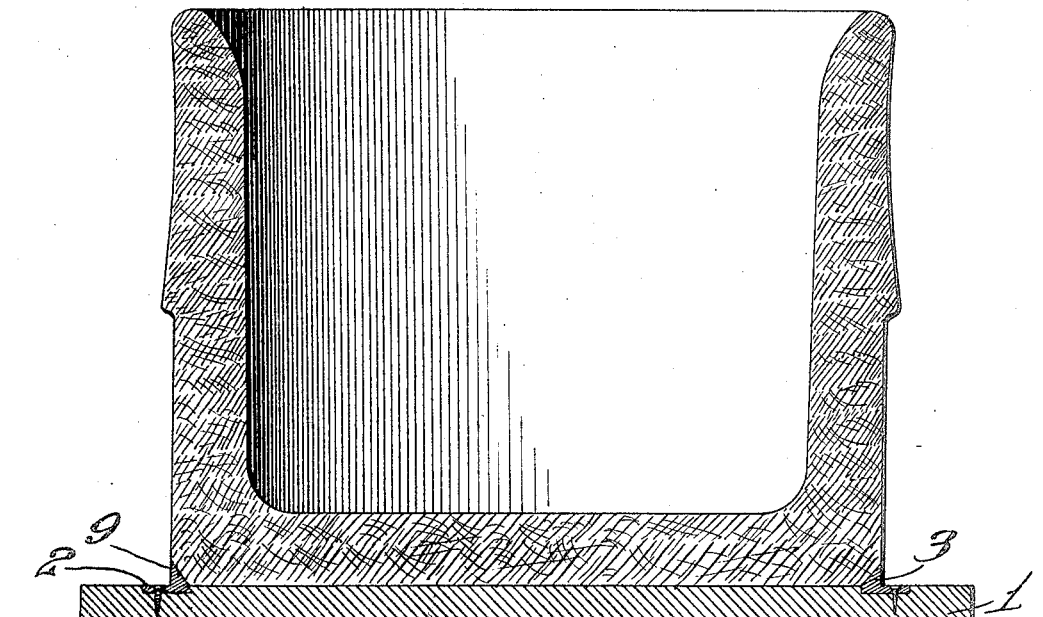

UNITED STATES PATENT OFFICE.

JOHN L. GREEN, OF ST. LOUIS, MISSOURI, ASSIGNOR TO LACLEDE-CHRISTY CLAY PRODUCTS COMPANY, OF ST. LOUIS, MISSOURI, A CORPORATION OF MISSOURI.

PROCESS FOR MANUFACTURING POTS FOR MELTING GLASS.

1,057,544.

Specification of Letters Patent.   Patented Apr. 1, 1913.

Application filed May 29, 1911.   Serial No. 629,983.

*To all whom it may concern:*

Be it known that I, JOHN L. GREEN, a citizen of the United States of America, residing in the city of St. Louis and State of Missouri, have invented certain new and useful Improvements in Processes for Manufacturing Pots for Melting Glass, of which the following is a specification.

This invention relates to glass melting pots in general, and has for its primary object to provide an improved process whereby the cost of manufacturing the glass melting pots can be reduced to the minimum, the regularity in shape and size be greatly enhanced, and various defects encountered in the drying process be entirely obviated.

With these and other objects in view, my improved process consists in the operations and treatments set forth in the specification and in the appended claim, reference being had to the accompanying drawings exemplifying the apparatus for carrying the process into effect.

Figure 1 is a vertical section of a molding board. Fig. 2 is a similar section showing the bottom flask in position on the molding board. Fig. 3 is a similar section, showing the formation of the bottom of the pot. Fig. 4 is a similar view with the bottom flask removed. Fig. 5 is a vertical section through the pot molding flask, showing the central core positioned therein upon the previously formed bottom. Fig. 6 is a similar view showing the molding operation carried to completion. Fig. 7 is a similar sectional view, with the flask removed, showing the completed glass pot ready for use.

In processes at present in vogue for building pot for melting glass, it is customary to build the pot in sections, one at a time, each section being left to slightly dry out before superposing thereon the next higher section. In carrying the old processes into effect, it is necessary to work the clay while it is quite plastic and very soft, for which purpose, it must, of necessity, contain a great deal of water. Inasmuch as each course or spell must be allowed to stiffen before another is superposed thereon, it requires from seven to eight days to complete the pot, which is thus constructed in four or five spells, each in a different state or condition of drying. For this reason, each course or spell is undergoing a different degree of shrinkage than the other courses. Moreover, there are well-marked joints between the adjoining courses or spells. Another defect is the formation of globules of water in the clay by reason of the soft working of the same, a defect which renders the body of the pot less dense and less uniform in texture. To overcome all of these defects constitutes the main general object of the present invention.

Referring more specifically to the drawings and to the exemplification of the invention shown therein, the mold board 1, which is provided with an annulus 2 of any suitable metal, provided with an annular projecting lug or ring 3, is first set into position. After this, a bottom flask, which is preferably constructed in two portions 4 and 5, is seated upon the annular projection 3, as shown in Fig. 2; said bottom flask being provided with an annular groove fitting the annular ring 3. As shown in Fig. 3, a mass of clay mixture 6 is compressed within the bottom flask 4 and 5, after which, said bottom flask members 4 and 5 are removed to leave the bottom slab 6, as shown in Fig. 4, in order to provide means for forming the lateral walls of the melting pot and to form an integral connection between the lateral walls of the pot and the bottom slab 6, while at the same time making the mass homogeneous throughout and without any joining lines. The flask for the upper portion of the pot is constructed preferably in two parts 7 and 8, said parts, when assembled, being adapted to abut along their inner lower edge around the vertical face 9 of the ring 3; said ring being beveled inwardly for the sake of imparting a finish to the bottom edge of the pot. The upper flask comprising the members 7 and 8, is made of substantially larger diameter than the slab 6 so that when in position the clay mass for forming the lateral walls of the pot may be forced down between it and the slab 6 and be thoroughly intermingled with the slab 6 to form an integral mass of uniform texture throughout. Before this is done, however, a core 10 is disposed centrally within the flask members 7 and 8 upon the bottom slab 6.

The sides of the melting pot are formed in one continuous operation by having masses of the clay deposited in the annular space formed between the flask members 7 and 8 and the core 10, while at the same time the clay is being tamped vigorously to exhaust all excess of water and to secure a dense body in both walls and bottom. When the top of the mold has been reached, therefore, as shown in Fig. 6, there will be no joints whatsoever, the mold being in but a single homogeneous mass of clay in the desired form, from which the flask members 7 and 8 can be at once withdrawn to permit the glass melting pot being finished into the form shown in Fig. 7.

The advantages of my improved process may be briefly stated as follows: First, the cost of manufacturing glass melting pots is very greatly reduced below that of any process of manufacture known to-day in this art. This process permits the use of clay having a maximum stiffness, which, by reason of its comparative freedom from water, can be formed into a more dense body in both walls and bottom, thus eliminating a great many of the common defects to be encountered in the usual well-known process of building these pots in spells or courses. Thus the clay of the newly molded pot is adapted to dry out much more rapidly than heretofore. Moreover, there is only one shrinkage throughout to be considered, and inasmuch as the pots can be turned over within a relatively short time after they have been completed, both the sides and bottom can be more thoroughly exposed to the air for drying. The present process produces a far stronger and more durable pot than is possible by the old well-known methods, thus lessening the liability of breakage from shock while being handled in the green state as well as while being used in glass manufacture.

An important feature of my improved process is the breaking down of the edge of the molded bottom when the addition of the side wall of the pot is commenced. This forms an intimate union of fresh irregular surfaces and gives the pot an integral character that it would not have if the side wall were simply superposed on the edge of the molded bottom. This breaking down of the edge of the molded bottom is facilitated by forming the side wall between a flask and a core, the flask having its internal diameter greater than the diameter of the molded bottom of the core having its diameter less than that of the molded bottom.

What I claim is:

The process of molding a clay pot for melting glass, which consists in first molding the bottom of the pot within a suitable flask, then removing the said flask and replacing it by a flask of greater diameter than the molded bottom and also placing a core of less diameter upon the molded bottom, then tamping clay down between said last-named flask and said core and thereby breaking down the edge of the molded bottom to form a secure joint therewith, and thereafter continuously adding clay and tamping the same until the side walls of the pot are completely formed.

JOHN L. GREEN.

In the presence of—
V. L. LAMY,
B. C. RANDALL.

---

Copies of this patent may be obtained for five cents each, by addressing the "Commissioner of Patents, Washington, D. C."